Patented Sept. 10, 1935

2,014,207

UNITED STATES PATENT OFFICE 2,014,207

AZO DYE AND METHOD FOR ITS PREPARATION

Clifford Paine, Handforth, England, assignor to Imperial Chemical Industries Limited, a corporation of Great Britain No Drawing. Application November 11, 1932, Serial No. 642,242. In Great Britain November 26, 1931

14 Claims. (Cl. 260—72)

This invention relates to new azo dyes and more particularly refers to polyazo dyes, especially adapted for dyeing cotton and artificial silk in the various shades of green.

It is an object of this invention to produce polyazo dyes having exceptional affinity for cotton and artificial silk. A further object is to produce dyes having at least three azo groups which impart fast colors, particularly in the numerous shades of green, to textile material. Additional objects will appear hereinafter.

These objects are attained by the present invention wherein a diazotized amine of the benzene or naphthalene series is coupled with a 1-arylamine-5-pyrazolone which may have groups such as alkyl or carboxyl substituted in the 3-position, diazotizing the resulting amino-azo compound and coupling it with a primary amine of the benzene or naphthalene series, diazotizing the resulting amino-disazo compound and coupling it with a substituted naphthalene compound, preferably naphthol, naphthylamine, aminonaphthol, or sulfonic, carboxylic or N-substituted derivatives thereof.

The invention may be more fully understood by reference to the following illustrative examples in which the quantities are stated in parts by weight.

Example 1

38 parts of the sodium salt of the amino-azo compound obtained by coupling diazotized sulfanilic acid with an equimolecular proportion of m-amino-phenyl-methyl-pyrazolone were dissolved in 1000 parts water at 10–15° C. 35 parts of 20% aqueous sodium nitrite were added, followed by 38 parts of hydrochloric acid (sp. gr. 1.16). Diazotization was allowed to proceed for 1½ hours. Solid sodium acetate was then added until the diazo suspension was neutral to Congo red paper. 15.3 parts of 2,5-dimethoxyaniline were then dissolved in 450 parts of water and 12 parts of hydrochloric acid (sp. gr. 1.16) and this solution was added gradually to the diazo suspension. After stirring for 5 hours the mixture was heated to 35° C. and kept at that temperature for a further 8 hours, to complete the coupling. The temperature was finally raised to 75° C. and the disazo compound, which was out of solution, was filtered off. The disazo compound was then disolved in 1000 parts of water and 23 parts of 30% aqueous caustic soda. At a temperature of 45–50° C. 35 parts of 20% aqueous sodium nitrite were added to this solution, followed by 52 parts of hydrochloric acid (sp. gr. 1.16), added quickly. Diazotization was substantially completed after stirring for 1 hour and the diazo-disazo suspension was then cooled to 5° C. prior to effecting coupling by adding it gradually to a solution of 374 parts of 1-p-aminobenzoylamino-8-naphthol-4-sulfonic acid in 400 parts of water and 60 parts of aqueous ammonia (sp. gr. .880) at a temperature of 0° C. The new trisazo dyestuff so formed was isolated from solution by the addition of salt, and filtration. It dyed cotton in clear bluish-green shades and, by further diazotization and development on the fiber with 1-phenyl-3-methyl-5-pyrazolone yielded clear yellowish-green shades.

Example 2

38 parts of the sodium salt of the amino-azo compound obtained by coupling diazotized sulfanilic acid with an equimolecular proportion of m-aminophenyl-pyrazolone were dissolved and diazotized as described in Example 1. The diazo-azo compound thus obtained was added gradually to a solution of 28.9 parts of the sodium salt of 1-amino-2-ethoxy-naphthalene-6-sulfonic acid in 600 parts of water and 40 parts of sodium bicarbonate. When coupling was complete the disazo compound was salted out by adding 550 parts of common salt and was filtered off. The disazo compound was then dissolved at 45° C. in 1000 parts of water and diazotized by adding 35 parts of 20% aqueous sodium nitrite followed by 45 parts of hydrochloric acid (sp. gr. 1.16). After stirring for 1 hour at 40–45° C. the diazo-disazo compound was cooled to 5° C. and was run slowly into a solution of 32.6 parts of the sodium salt of 2-naphthol-3,6-disulfonic acid in 400 parts of water and 48 parts of anhydrous sodium carbonate. After stirring for two hours at a temperature of 0–5° C. the coupling was complete and the new trisazo dyestuff was isolated by the addition of salt. It dyed cotton and viscose artificial silk in bluish-green shades.

Example 3

30.3 parts of 2-naphthylamine-4,8-disulfonic acid were diazotized in the customary manner and coupled at 10° C. with a solution of 18.9 parts of 1(m-aminophenyl)-3-methyl-5-pyrazolone in 250 parts of water, 10 parts of 40% sodium hydroxide and 10 parts sodium carbonate. The mono-azo compound so formed was isolated by salting out and filtering. The yellow precipitate was re-dissolved in 1000 parts water at 30° C. and diazotized by the addition of 35 parts of 20% aqueous sodium nitrite followed by 40 parts of hydrochloric acid (sp. gr. 1.16). Diazotization was allowed to proceed for 5 hours and the suspension of the diazo-azo compound was slowly added to a solution of 23.0 parts of the sodium salt of 1-naphthylamine-2-thioglycollic acid and 20 parts of sodium carbonate in 800 parts of water, at a temperature of 10° C. The reaction mixture was allowed to stir one hour and the amino-disazo compound was then isolated by the addition of salt, followed by filtration. The brownish orange amino-disazo compound was further dissolved in 600 parts of water at a temperature of 30° C., 35 parts of 20% aqueous sodium nitrite were added, followed by 40.0 parts of hydrochloric acid (sp. gr. 1.16). After stirring 2 hours at 25–30° C. diazotization was substantially complete and, by the addition of 120 parts of sodium chloride followed by filtration, the diazo-disazo compound was obtained as a brown aqueous paste which was added in small quantities at a time to an ice-cold solution of 38.0 parts of the sodium salt of 2-p-aminobenzoylamino-5-naphthol-7-sulfonic a c i d in 200 parts water and 24.0 parts of aqueous ammonia (sp. gr. .880). The new trisazo dyestuff so formed was isolated from solution by the addition of salt and filtration. It dyed cotton in bluish-green shades which, by further diazotization and development on the fiber with acetoacetic o-chloroanilide, yielded clear yellowish-green shades of excellent fastness to washing.

Example 4

The diazo-disazo compound obtained exactly as described in Example 3 was added as an aqueous paste to an ice-cold solution of 25.9 parts of the sodium salt of 2-methylamino-naphthalene-7-sulfonic acid in 100 parts water and 20 parts of pyridine. The new trisazo dyestuff so formed was isolated by the addition of sodium chloride and filtration. It dyed cotton and viscose artificial silk in blue-green shades.

Example 5

45.0 parts of the sodium salt of the amino-azo compound obtained by coupling diazotized 2,5-dichloroaniline-4-sulfonic acid with an equimolecular proportion of 1(m-aminophenyl)-3-methyl-5-pyrazolone were dissolved in 1000 parts of water at 25–30° C. 35 parts of 20% aqueous sodium nitrite were then added followed by 38 parts of hydrochloric acid (sp. gr. 1.16). Diazotization was allowed to continue for 2 hours, when the suspension of diazo-azo compound was added gradually to a solution of 28.9 parts of the sodium salt of 1-amino-2-ethoxynaphthalene-6-sulfonic acid in 600 parts of water and 40 parts of sodium bicarbonate. When coupling was completed, the disazo compound was salted out by adding 550 parts of common salt and was then filtered off. The disazo compound was dissolved at 30–35° C. in 1000 parts of water and 35 parts of 20% aqueous sodium nitrite were then added, followed by 200 parts of common salt and 45 parts of hydrochloric acid (sp. gr. 1.16). After stirring for 2 hours at 30–35° C. the diazo-disazo compound was filtered off and added slowly as an aqueous paste to an ice-cold solution of 33.7 parts of the sodium salt of 2-phenylamino-5-naphthol-7-sulfonic acid in 160 parts of water, 40 parts of pyridine and 30 parts of aqueous ammonia (sp. gr. 1.16). The new trisazo compound was filtered off and purified if necessary by re-salting from hot water. It dyed cotton in greenish-blue shades of good fastness.

Example 6

43.0 parts of the sodium salt of the amino-azo dyestuff obtained by coupling diazotized 2-naphthylamine-8-sulfonic acid with an equimolecular proportion of 1(p-aminophenyl)-3-methyl-5-pyrazolone were dissolved in 750 parts of water at 25–30° C. and diazotized by the addition of 35 parts of 20% aqueous sodium nitrite followed by 40 parts of hydrochloric acid (sp. gr. 1.16). After stirring 2 hours the suspension of diazo-azo compound was slowly added to a solution of 22.0 parts of the sodium salt of 1-naphthylamine-7-sulfonic acid in 600 parts of water and 20 parts of sodium carbonate at a temperature of 5–10° C. Coupling was completed in about 1 hour and the amino-disazo compound was separated by the addition of salt, followed by filtration. The brownish-orange disazo compound was dissolved in 750 parts of water at 30° C., 35 parts of 20% aqueous sodium nitrite were added followed by 150 parts of common salt. Finally, 40 parts of hydrochloric acid (sp. gr. 1.16) were added and diazotization continued for 2 hours at 25–30° C. The diazo-disazo compound was isolated by filtration and then added gradually, as an aqueous paste, to an ice-cold solution of 48.6 parts of the disodium salt of 1-o-chlorobenzoylamino-8-naphthol-3,6-disulfonic acid in 100 parts of water, 40 parts of pyridine and 5 parts of aqueous ammonia (sp. gr. .880). The resulting trisazo dyestuff was isolated by the addition of common salt followed by filtration. The new dyestuff dyed cotton in yellowish-green shades.

Example 7

36.0 parts of the amino-azo compound obtained by coupling diazotized m-aminobenzoic acid with an equimolecular proportion of 1(p-aminophenyl)-5-pyrazolone-3-carboxylic acid were dissolved in 500 parts of water and diazotized at 10° C. by the addition of 35 parts of 20% aqueous sodium nitrite followed by 40 parts of hydrochloric acid (sp. gr. 1.16). The diazotization was agitated at 10° C. for 2 hours when the reaction mixture was added slowly to an alkaline suspension of 1-naphthylamine prepared by adding 25 parts of sodium carbonate to an ice-cold solution of 14.4 parts of 1-naphthylamine hydrochloride in 800 parts of water. Coupling was substantially completed in 2 hours and the reaction mixture was made acid to Congo red paper with hydrochloric acid, heated to 80° C. and the precipitated disazo compound filtered off. This disazo compound was then re-dissolved in 1000 parts of water and 10.0 parts of 40% sodium hydroxide and further diazotized by the addition of 35 parts of 20% aqueous sodium nitrite followed, at a temperature of 25° C. by 40 parts of hydrochloric acid (sp. gr. 1.16). Diazotization was allowed to proceed for 3 hours and the mixture was then added gradually to an ice-cold solution of 36.0 parts of the disodium salt of 1-amino-8-naphthol-2,4-disulfonic acid in 200 parts of water and 24.0 parts of aqueous ammonia (sp. gr. .880). The new trisazo dyestuff was isolated by the addition of salt, followed by filtration. It dyed cotton in green shades.

Example 8

24.9 parts of the sodium salt of a 1(p-aminosulfophenyl)-3-methyl-5-pyrazolone, obtained by the sulfonation of 1(p-aminophenyl)-3-methyl-5-pyrazolone with chlorosulfonic acid in tetrachloroethane and having as its probable constitution. 1 - (4' - amino - 3' - sulfophenyl) - 3 - methyl-5-pyrazolone, was coupled in the customary manner with an equimolecular proportion of diazobenzene-4-sulfonic acid. The mono-azo compound so produced was further diazotized in 500 parts of water at 25–30° C. by the addition of 35 parts of 20% aqueous sodium nitrite, followed by the addition of 38 parts of hydrochloric acid (sp. gr. 1.16). Diazotization was substantially completed in about 1 hour. When the diazo-azo compound was added gradually to an alkaline suspension of 2,5-dimethoxyaniline prepared by adding 25 parts of sodium carbonate to an ice-cold solution of 15.2 parts of 2:5-dimethoxyaniline hydrochloride in 500 parts of water. Coupling was allowed to continue for 2 hours when the reaction mixture was made acid to Congo red paper with hydrochloric acid, heated to 80° C., 100 parts of common salt added and the precipitated amino-disazo compound filtered off. The precipitate was re-dissolved in 500 parts of water and 10 parts of 40% sodium hydroxide, 35 parts of 20% aqueous sodium nitrite added and followed, at a temperature of 20° C., by 40 parts of hydrochloric acid (sp. gr. 1.16). After diazotizing for 1½ hours the diazo-azo compound was filtered off and added, as an aqueous paste to an ice-cold solution of 32.9 parts of 1-acetylamino-8-naphthol-3,6-disulfonic acid in 100 parts of water, 12.0 parts of aqueous ammonia (sp. gr. .880) and 40 parts of pyridine. The new trisazo dyestuff was isolated by the addition of common salt and filtered off. It dyed cotton in clear green shades.

Example 9

43.3 parts of the sodium salt of the mono-azo dyestuff, obtained by coupling 1-(aminonaphthyl)-3-methyl-5-pyrazolone with an equimolecular proportion of diazotized aniline-3-sulfonic acid, were dissolved in 100 parts of water and diazotized at 20° C. by the addition of 35 parts of 20% aqueous sodium nitrite followed by 38 parts of hydrochloric acid (sp. gr. 1.16) and agitating for 2 hours. The diazo-azo compound was then added gradually to an ice-cold solution of 28.9 parts of the sodium salt of 1-amino-2-ethoxynaphthalene-6-sulfonic acid in 600 parts of water and 30 parts of sodium carbonate. When coupling was completed the disazo compound was salted out by adding 600 parts of common salt and was filtered off. The diazo compound was then dissolved in 1000 parts of water, 35 parts of 20% aqueous sodium nitrite and 150 parts of common salt were added, followed, at a temperature of 30° C. by 40 parts of hydrochloric acid (sp. gr. 1.16). After stirring for 2 hours the diazo-azo compound was filtered off as a dark brown aqueous paste which was then added gradually to an ice-cold solution of 31.5 parts of 2-phenylamino-5-naphthol-7-sulfonic acid in 120 parts of water, 12 parts of aqueous ammonia (sp. gr. .880) and 40 parts of pyridine. The trisazo dyestuff so formed was isolated by addition of salt and was filtered off. The new dyestuff dyed cotton in blue-green shades.

The dyes described herein may be given the following general formula:

$$R_1-N=N-R_2-N=N-R_3-N=N-R_4$$

In this formula $R_1$ represents a member of the benzene or naphthalene series which may have numerous groups substituted thereon without detracting from the advantages of the resulting product. Among these substituents may be mentioned the sulfonic, carboxylic acid and halogen groups. One or more of these groups may be substituted on the first component, and they may occupy other positions than those referred to in the examples.

The second component is a 1-arylamine-5-pyrazolone which may have substituents such as alkyl and carboxylic radicals substituted in the 3-position. It is not intended to limit this invention to pyrazolone derivatives having phenyl or naphthyl groups substituted in the 1-position, since other aryl groups may be substituted thereon as well as other derivatives of phenyl or naphthyl groups than those referred to supra. It is preferable to use, for this component, a 1-meta- or 1-para-aminoaryl-3-methyl-5-pyrazolone.

The third component, represented by $R_3$, is a primary amine of the benzene or naphthalene series, and the best results are obtained by selecting primary amines which are capable of coupling in the position para to the amino group, although the invention is not restricted thereto. Examples of compounds falling within this class are meta-amino-para-cresol-methyl ether, 2-5-dialkoxyaniline, alpha-naphthylamine, 2-alkoxynaphthylamine, in addition to the 6- or 7-sulfonic acid derivatives of these naphthylamines.

The fourth component, heretofore termed $R_4$, may be a naphthol, naphthylamine or aminonaphthol, or a sulfonic acid derivative of any of these as well as a naphthol carboxylic acid or an N-substituted naphthol, naphthylamine or aminonaphthol sulfonic acid, wherein the N-substituent group may contain a diazotizable amino group. When the N-substituent group contains a diazotizable amino group the new dye may be diazotized and developed on the fiber, or the same combinations may be made in substance.

Coupling of this end component with the diazo-disazo salt may take place in acid, neutral or alkaline medium, depending upon the different compounds used and the results desired.

The products described herein have excellent affinity for textile materials such as cotton and artificial silk to which they impart attractive shades. These shades are very desirable from a commercial standpoint and are at the present time in great demand by textile manufacturers.

As many apparently widely different embodiments of this invention may be made without departing from the spirit and scope thereof, it is to be understood that I do not limit myself to the specific embodiments thereof except as defined in the appended claims.

I claim:

1. A process for producing polyazo dyes which comprises coupling a diazotized amine of the benzene or naphthalene series with a 1-arylamine-5-pyrazolone, diazotizing the resulting amino-azo compound and coupling it with a primary amine of the benzene or naphthalene series, diazotizing the resulting amino-disazo compound and coupling it with a member selected from the group consisting of naphthol-sulfonic acid and naphthylamine-sulfonic acid.

2. A process for producing polyazo dyes which comprises coupling a diazotized amine of the benzene or naphthalene series with a 1-aminophenyl-5-pyrazolone, diazotizing the resulting amino-azo compound and coupling it with a primary amine of the benzene or naphthalene series, diazotizing the resulting amino-disazo compound and coupling it with a member selected from the group consisting of naphthol-sulfonic acid and naphthylamine-sulfonic acid.

3. A process for producing polyazo dyes which comprises coupling a diazotized amine of the benzene or naphthalene series with a 1-aminophenyl-3-methyl-5-pyrazolone, diazotizing the resulting amino-azo compound and coupling it with an alpha-naphthyamine, diazotizing the resulting amino-disazo compound and coupling it with a member selected from the group consisting of naphthol-sulfonic acid and naphthylamine-sulfonic acid.

4. A process for producing polyazo dyes which comprises coupling a diazotized amine of the benzene or naphthalene series with a 1-aminophenyl-3-methyl-5-pyrazolone, diazotizing the resulting amino-azo compound and coupling it with an alpha-naphthylamine, diazotizing the resulting amino-disazo compound and coupling it with naphthol-sulfonic acid.

5. A process for producing polyazo dyes which comprises coupling a diazotized amine of the benzene or naphthalene series with a 1-aminophenyl-3-methyl-5-pyrazolone, diazotizing the resulting amino-azo compound and coupling it with an alpha-naphthylamine, diazotizing the resulting amino-disazo compound and coupling it with naphthlyamine-sulfonic acid.

6. A process for producing a polyazo dye which comprises coupling diazotized sulfanilic acid with m-aminophenyl-pyrazolone, diazotizing the resulting amino-azo compound and coupling it with 1-amino-2-ethoxy-naphthalene-6-sulfonic acid, diazotizing the resulting amino-disazo compound and coupling it with 2-naphthol-3-6-disulfonic acid.

7. A process for producing a polyazo dye which comprises coupling diazotized 2-naphthylamine-4-8-disulfonic acid with 1-(m-aminophenyl)-3-methyl-5-pyrazolone, diazotizing the resulting amino-azo compound and coupling it with 1-naphthylamine-2-thioglycollic acid, diazotizing the resulting amino-disazo compound and coupling it with 2-methylamino-naphthalene-7-sulfonic acid.

8. Polyazo dyes having the following general formula:

wherein $R_1$ represents the residue of an amine of the benzene or naphthalene series, $R_2$ represents the residue of a 1-arylamine-5-pyrazolone, $R_3$ represents the residue of an amine of the benzene or naphthalene series, and $R_4$ represents the residue of naphthol-sulfonic acid or naphthylamine-sulfonic acid.

9. Polyazo dyes having the following general formula:

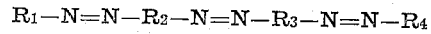

wherein $R_1$ represents the residue of an amine of the benzene or naphthalene series, $R_2$ represents the residue of a 1-aminophenyl-5-pyrazolone, $R_3$ represents the residue of an amine of the benzene or naphthalene series, and $R_4$ represents the residue of naphthol-sulfonic acid or naphthylamine-sulfonic acid.

10. Polyazo dyes having the following general formula:

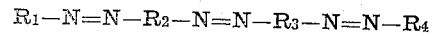

wherein $R_1$ represents the residue of an amine of the benzene or naphthalene series, $R_2$ represents the residue of a 1-aminophenyl-3-methyl-5-pyrazolone, $R_3$ represents the residue of an alpha-naphthylamine, and $R_4$ represents the residue of naphthol-sulfonic acid or naphthylamine-sulfonic acid.

11. Polyazo dyes having the following general formula:

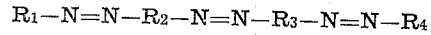

wherein $R_1$ represents the residue of an amine of the benzene or naphthalene series, $R_2$ represents the residue of a 1-aminophenyl-3-methyl-5-pyrazolone, $R_3$ represents the residue of an alpha-naphthylamine, and $R_4$ represents the residue of naphthol-sulfonic acid.

12. Polyazo dyes having the following general formula:

$$R_1-N=N-R_2-N=N-R_3-N=N-R_4$$

wherein $R_1$ represents the residue of an amine of the benzene or naphthalene series, $R_2$ represents the residue of a 1-aminophenyl-3-methyl-5-pyrazolone, $R_3$ represents the residue of an alpha-naphthylamine, and $R_4$ represents the residue of naphthylamine-sulfonic acid.

13. A polyazo dye having the following formula in the form of its free acid:

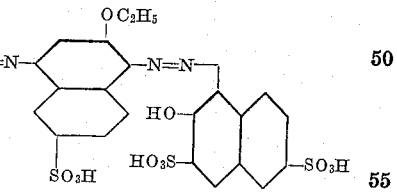

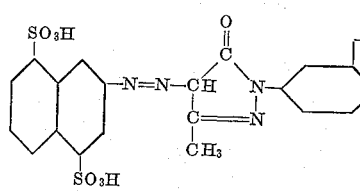

14. A polyazo dye having the following formula in the form of its free acid:

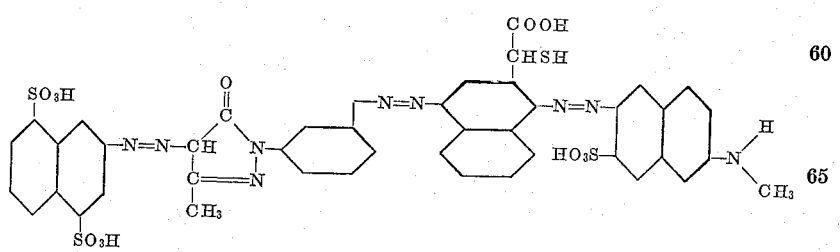

CLIFFORD PAINE.